Jan. 7, 1947.                     W. RUDDOCK                     2,413,786
                CABLE GUIDING MEANS FOR MATERIAL HANDLING APPARATUS
                     Filed Oct. 18, 1943                2 Sheets-Sheet 1

INVENTOR.
WILLIAM RUDDOCK,
BY
ATTORNEY.

Jan. 7, 1947. W. RUDDOCK 2,413,786
CABLE GUIDING MEANS FOR MATERIAL HANDLING APPARATUS
Filed Oct. 18, 1943 2 Sheets-Sheet 2
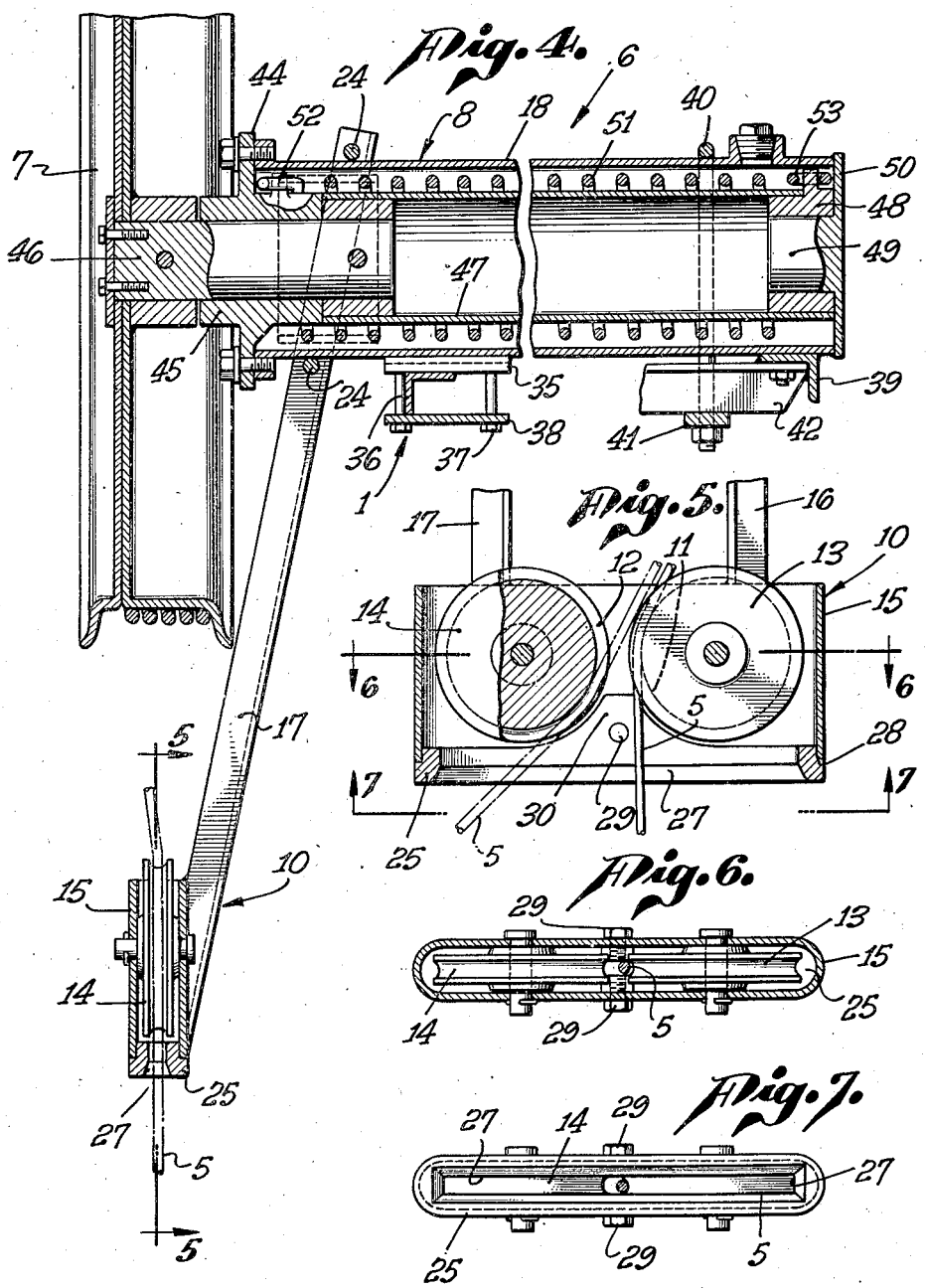
INVENTOR.
WILLIAM RUDDOCK,
BY
ATTORNEY.

Patented Jan. 7, 1947

2,413,786

UNITED STATES PATENT OFFICE 2,413,786

CABLE GUIDING MEANS FOR MATERIAL HANDLING APPARATUS

William Ruddock, South Pasadena, Calif., assignor, by direct and mesne assignments, to The McCaffrey Ruddock Tagline Corporation, Los Angeles, Calif., a corporation of California Application October 18, 1943, Serial No. 506,668

2 Claims. (Cl. 254—190)

1

This invention relates to cable tensioning apparatus; more particularly the invention relates to means for maintaining a cable or line free from slack, and contemplates an improved fair lead for guiding the cable to such means.

In various types of hoisting equipment, such as those utilizing a bucket for handling material, it is common to attach a line or cable to the bucket to steady the bucket and prevent its rotating as it hangs by its hoisting cable, due to the tendency of the hoisting cable to untwist, or to other causes. For such a line to be effective, and to prevent excessive slack therein as the bucket is raised or lowered, means are generally provided to maintain the line under tension and to vary the effective length of the line in accordance with the position of the bucket so that the line is maintained under substantially constant tension. One method of appropriately tensioning such a line is by the provision of a rotatable drum having spring means continuously urging it to rotate in one direction and upon which the line is wound so as to wind on the drum or unwind therefrom in response to movement of the bucket. Such an arrangement is shown in my patents, Number 2,166,479 and Number 2,303,902, issued July 18, 1939, and November 24, 1942, respectively.

It is an object of this invention to provide novel means for guiding such a line to the tensioning means.

It is another object of this invention to provide such guide means which may be readily adjusted to accommodate various directions of approach of the line to the tensioning means.

It is another object of this invention to provide such guide means adapted to be mounted in the plane of a drum for accommodating the cable or line and arranged for angular adjustment about the axis of the drum.

It is still another object of this invention to provide such guide means incorporating a pair of curved surfaces between which the line passes, whereby a large variation in the angle at which the line enters the guide means may be accommodated, at the same time the angle through which the line is bent by the guide means is kept small.

It is a still further object of this invention to provide a novel form of angularly adjustable clamping means.

This invention possesses many other advantages and has other objects which may be made more easily apparent from a consideration of one embodiment of the invention. For this purpose there is shown a form in the drawings accompanying

2 and forming part of the present specification. This form will now be described in detail, illustrating the general principles of the invention; but it is to be understood that this detailed description is not to be taken in a limiting sense, since the scope of the invention is best defined by the appended claims.

In the drawings:

Figure 4 is a section on a further enlarged scale taken on line 4—4 of Figure 3;

Figure 5 is a fragmentary section taken on line 5—5 of Figure 4;

Figure 6 is a section taken on line 6—6 of Figure 5; and,

Figure 7 is an elevation as seen from line 7—7 of Figure 5.

Figure 1:
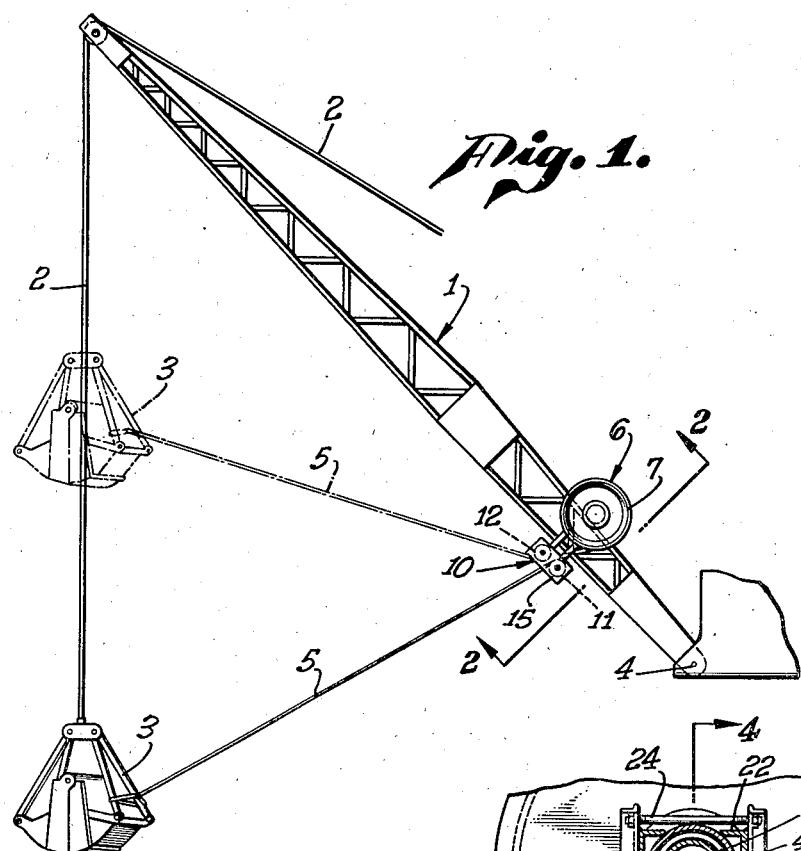
Figure 1 is an elevation showing the invention in use.

Referring to Figure 1 of the drawings, the boom of a conventional hoisting apparatus is indicated by 1 and is shown by way of illustration as supporting, by means of a cable 2, a material handling bucket 3. As is well understood, the boom 1 is arranged to be swung about its lower end 4 to adjust the position of the bucket 3, and the bucket is also arranged to be raised and lowered with respect to the boom by means of the cable 2. To steady the bucket 3 and prevent its swinging and rotating with respect to the boom, a line or cable 5 is attached to the bucket 3 and extends to the boom, where means 6 are provided for maintaining the line under appropriate tension and preventing slackening thereof for any position of the bucket.

Figure 3:
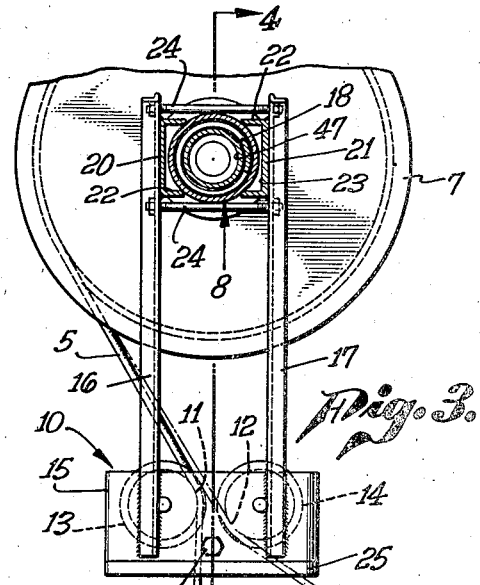
Figure 3 is a section taken on line 3—3 of Figure 2.
Figure 2:
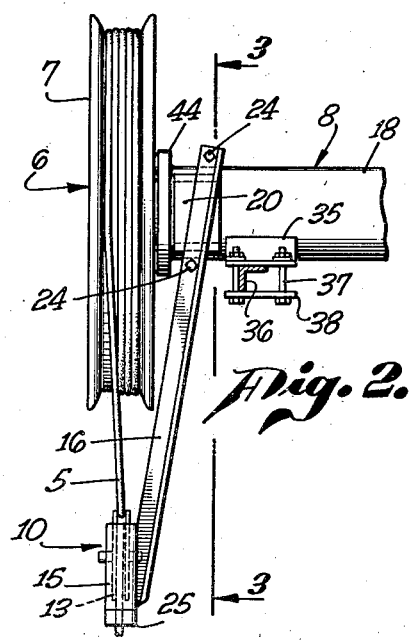
Figure 2 is a fragmentary elevation on an enlarged scale as seen from line 2—2 of Figure 1.

The tensioning means 6 as shown in Figures 2, 3 and 4, includes a drum 7 for accommodating the cable 5, the drum 7 being rotatably mounted on supporting means 8 which is aproprietly secured on the boom 1. Means are provided for exerting a force continuously urging the drum 7 to rotate in a direction to wind the cable 5 thereon, this force being only sufficient to prevent any slack in the cable between the drum and the bucket 3 and allowing the drum to revolve to unwind the cable freely as required by the raising and lowering of the bucket 3. Tensioning means of this type are shown and described in my aforementioned patents.

The means for guiding the cable 5 between the drum 7 and the bucket 3 is generally indicated by 10, and comprises means forming a pair of opposed curved surfaces 11 and 12 carried by a frame 15. The surfaces 11 and 12 are curved in the plane of the drum 7 and may be conveniently provided by sheave wheels 13 and 14 rotatably mounted on the frame 15. The guide means 10 is mounted in the plane of the drum 7, being supported for adjustment about the axis of the drum, to accommodate different directions of approach of the cable to the drum.

As clearly indicated in Figure 1, the cable 5 moves through a large angle with respect to the guide means 10 as the bucket 3 is raised and lowered, such movement causing the cable to move out of contact with one of said surfaces 11 or 12 and into contact with the other surface. Thus, with the bucket 3 in the full line position, the cable 5 passes over the surface 11 on its way to the drum 7 and is clear of the surface 12 (see also Figures 3 and 5). Similarly, as the bucket 3 is lowered, the cable 5 remains in contact with the surface 11, the angle of contact increasing. As the bucket 3 is raised, the cable 5 will move out of engagement with the surface 11 and pass about a portion of the surface 12 on its way to the drum 7, as indicated by broken lines, Figures 1, 3 and 5.

Brief consideration will show that by providing a pair of surfaces 11 and 12 as described, the angle through which the cable 5 is bent as it is guided to the drum 7 is materially reduced for a given movement of the bucket 3, since the total required angle is divided between the two surfaces. To take full advantage of this fact, it is necessary that the position of guide means 10 be angularly adjustable about the axis of the drum 7. In this way the angular movement of the cable may be substantially equally divided between the two surfaces. For this purpose the frame 15 is supported and arranged for angular movement about the axis of the drum 7. Thus, the support 8 for the drum 7 can be conveniently used for supporting the frame 15, the frame 15 being positioned to appropriately guide the cable 5 to the drum. For this purpose, the frame 15 has a pair of arms 16 and 17 which may conveniently be angle irons, secured thereto as by welding. As best shown in Figures 2 and 3, the arms 16 and 17 extend from the frame 15 to the drum support 8, being suitably inclined, or provided with an offset, to position the sheaves 13 and 14 in alignment with, or in the plane of, the drum 7 and arranged to straddle the support 8.

The support 8 as shown comprises a cylindrical member 18, or at least is provided with a cylindrical surface on that portion which is between the arms 16 and 17, the cylindrical surface being coaxial with the drum 7. For engaging the cylindrical surface of the member 18, each arm 16, 17 has a short length of channel-shaped bar 20, 21 secured thereto extending axially of the member 18. These channels 20 and 21 are preferably of such proportions and size with respect to the diameter of the cylindrical surface that the ends of the legs 22 of the channels engage the cylindrical surface, the web 23 being clear of the surface. In this way, by forcing the arms 16 and 17 with the channels 20 and 21 together and into engagement with the cylindrical surface, the structure 10 is effectively secured to the support 8. For urging the arms 16 and 17 together, bolts 24 are provided which extend through the arms 16 and 17 on opposite sides of the member 18.

It will be apparent that by loosening the bolts 24 the structure 10 may be moved angularly about the drum 7, whereby the sheaves 13 and 14 may be positioned to properly guide the line 5 to the drum. Tightening of the bolts serves to clamp the arms 16 and 17 together with the structure 10 in adjusted position. Thus, the support 8 can be mounted in any position, the structure 10 being adjusted accordingly.

Since the drum 7 and the surfaces 11 and 12 are in the plane of movement of the bucket 3, there is little tendency for the cable 5 to move laterally of the drum 7. To guide the cable in such direction, the frame 15 is arranged to provide a narrow passage for the cable over the curved surfaces 11 and 12, as indicated in Figures 6 and 7. To prevent rapid wear of the frame 15 by the cable 5 as it passes through the frame between the bucket 3, and the drum 7, the outer end of the opening in the frame 15 is provided with a liner 25 having a long narrow opening 27 for accommodating the cable. The exterior of the liner 25 is adapted to engage the interior surface of the frame 15, a lip 28 on the liner 25 engaging the lower edge of the frame 15. Cap screws 29 passing through the opposite sides of the frame 15 thread into lugs 30 on the liner 25, and serve to retain the liner in the frame 15. It will be plain that removal of the cap screws 29 will permit the liner 25 to be detached from the frame 15, after which a new liner may be installed and secured by replacement of the screws 29.

The support 8 for the drum 7 will now be briefly described, reference being had particularly to Figures 2 and 4. Therein it will be seen that the tubular member 18 has a mounting pad 35 secured to it near one end thereof for cooperating with a member 36 of the derrick boom 1, the pad 35 being clamped to the member by bolts 37 and a plate washer 38. The opposite end of the tubular member 18 rests on the member 39 on the other side of the boom 1, being secured thereto by a U-bolt 40 passing over the member 18 and engaging a plate washer 41 beneath a cross member 42 joining the boom members 36 and 39. This method of attachment permits the tensioning means 6 to be readily installed in any position on a derrick boom or other existing equipment without the need of drilling holes or altering the boom or equipment in any way. Furthermore, the tensioning means can be shifted easily to a different operating position should this seem desirable, or the entire structure can be reversed so as to place the drum 7 on the opposite side of the boom 1, the guide means 10 being angularly adjusted to properly position the guide sheaves 13 and 14.

The end of the member 18 adjacent the pad 35 is closed by a detachable head 44 having a hub 45 forming a bearing for the shaft 46, to the outer end portion of which the drum 7 is secured. The inner end portion of the shaft 46 has one end of an inner drum 47 secured thereto, the opposite end of the drum 47 having a bushing 48 fixed therein which is rotatably supported on a stationary stub shaft 49 formed on a head 50 closing the end of the member 18. A helical spring 51 surrounds the drum 47, being secured at one end 52 to the head 44 and at its other end 53 to the bushing 48 and hence to the drum 47.

It will be apparent that the spring 51 will urge the drum 7 to rotate so as to take up any slack in the line 5; further it will resiliently oppose rotation of the drum as the line 5 is unwound therefrom, thus maintaining the line under tension at all times. The tension in the spring 51 and hence in the line 5 can be adjusted by removing the bolts securing the head 44 in place, and rotating the head 44 to tighten or loosen the spring 51 as required.

I claim:

1. In a fair lead for use with a rotatable drum positioned beyond one end of a supporting structure, said structure providing a cylindrical surface extending entirely about the axis of said drum, means for guiding a line with respect to the drum, comprising means forming a pair of opposed convex surfaces providing a space through which the line is adapted to pass, and a frame secured at one end to said guide means, comprising a pair of spaced arms adapted to straddle said cylindrical surface, each of said arms having a pair of projecting elements at the opposite end from the guide means adapted to engage said surface at angularly spaced areas thereon of limited angular but substantial axial extent, and means for causing said arms to clamp said elements to said surface to secure said guide means with said convex surfaces in a plane normal to the drum axis and with said space in adjusted angular position about the drum axis.

2. In a fair lead for use with a rotatable drum positioned beyond one end of a supporting structure, said structure providing a cylindrical surface extending entirely about the axis of said drum, means for guiding a line with respect to the drum, comprising means forming a pair of opposed convex surfaces providing a space through which the line is adapted to pass, and a frame secured at one end to said guide means, comprising a pair of spaced arms adapted to straddle said cylindrical surface, each of said arms having a pair of projecting elements at the opposite end from the guide means adapted to engage said surface at angularly spaced areas thereon of limited angular but substantial axial extent, said frame having a length greater than the radius of the drum and being directed toward the drum, and means for causing said arms to clamp said projecting elements to said surface, the axial length of said elements serving in connection with the cylindrical surface to position said guide means at a point spaced beyond the periphery of the drum intermediate the ends of the drum, and with said convex surfaces curving in a plane normal to said drum axis.

WILLIAM RUDDOCK.